United States Patent [19]

Fahey

[11] 4,220,825
[45] Sep. 2, 1980

[54] TELEPHONE STATUS MONITOR CIRCIT

[75] Inventor: Robert J. Fahey, Burlington, Mass.

[73] Assignee: GTE Sylvania Incorporated, Stamford, Conn.

[21] Appl. No.: 965,809

[22] Filed: Dec. 4, 1978

[51] Int. Cl.$^2$ ............................................. H04M 3/22
[52] U.S. Cl. ........................... 179/18 FA; 179/18 AB
[58] Field of Search .......... 179/18 AB, 18 FA, 18 F, 179/175.2 C, 2 AM, 2 A, 2 DP, 2 R

[56] References Cited

U.S. PATENT DOCUMENTS

| | | |
|---|---|---|
| 3,205,312 | 9/1965 | Brightman et al. ................. 179/18 F |
| 3,564,143 | 2/1971 | Stewart, Jr. .......................... 179/2 A |
| 3,855,421 | 12/1974 | Pilling et al. ..................... 179/18 FA |
| 3,858,008 | 12/1974 | Remec ............................. 179/18 AB |
| 4,059,727 | 11/1977 | Kingswell et al. ............... 179/2 AM |

FOREIGN PATENT DOCUMENTS

1179603  10/1964  Fed. Rep. of Germany ..... 179/18 AB

*Primary Examiner*—Thomas W. Brown
*Attorney, Agent, or Firm*—Peter Xiarhos

[57] ABSTRACT

A telephone status monitor circuit for determining the on/hook and off/hook conditions of a telephone connected across standard tip and ring terminals of a telephone system. The telephone status monitor circuit includes a charging circuit, in the form of a series combination of a capacitor and a resistor, which is adapted to be alternately and periodically switched in and out of circuit with the tip and ring terminals. When the charging circuit is in circuit with the tip and ring terminals, the capacitor is charged to the value of the voltage across the tip and ring terminals. When the charging circuit is out of circuit with the tip and ring terminals, the charging circuit is coupled to additional circuitry which examines the value of the voltage across the capacitor. If the value of the voltage across the capacitor corresponds to an on/hook condition, a first output signal is produced by the additional circuitry. If the value of the voltage across the capacitor corresponds to an off/hook condition, a second output signal is produced by the additional circuitry.

8 Claims, 1 Drawing Figure

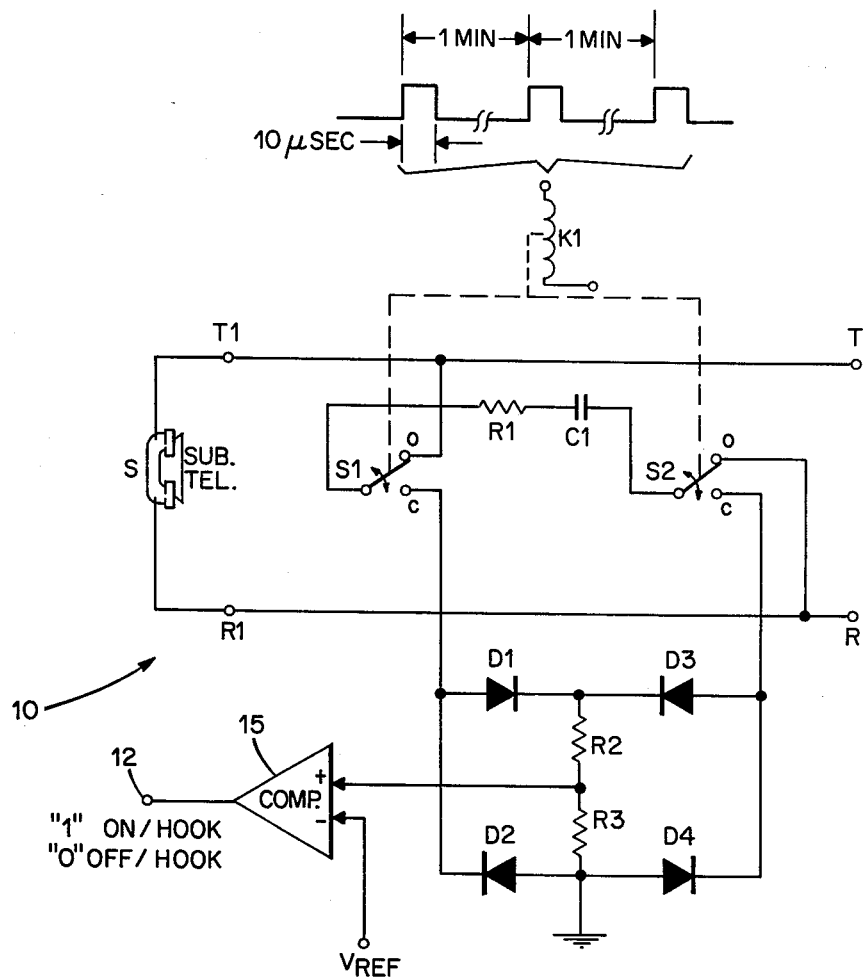

TELEPHONE STATUS MONITOR CIRCIT

CROSS-REFERENCE TO RELATED APPLICATION

In co-pending patent application Ser. No. 965,808, filed concurrently herewith in the names of Robert J. Fahey and Martin L. Resnick and assigned, respectively, to GTE Sylvania Incorporated and GTE Laboratories Incorporated, and entitled DATA TRANSMISSION CIRCUIT, there is disclosed a telephone status monitor circuit representing a variation of the telephone status monitor circuit disclosed and claimed in the present application.

BACKGROUND OF THE INVENTION

The present invention relates to a monitor circuit and, more particularly, to a telephone status monitor circuit for detecting on/hook and off/hook conditions of a standard telephone.

There are many applications in which it is desired to detect the status of a standard telephone, that is, whether the telephone is in an on/hook condition or an off/hook condition. For example, in co-pending application Ser. No. 965,808, referred to hereinabove in the section entitled CROSS-REFERENCE TO RELATED APPLICATION, there is disclosed and claimed a data transmission circuit for establishing a data path for the bidirectional transmission of data between first and second locations over a standard telephone line which is also used or shared by a telephone subscriber for making and receiving normal telephone calls. In order to establish the abovementioned data path it is necessary that the telephone of the subscriber not be in use, that is, that the telephone be in an on/hook condition. However, in detecting the on/hook condition, it is generally desirable, in order to comply with government regulations relating to the connection of equipment to telephone networks, that the equipment used to detect the on/hook condition be generally isolated in some fashion from the telephone line. The present invention is directed to a simple, low-cost telephone status monitor circuit capable of satisfying the above-mentioned isolation requirements while also providing indications of on/hook (and off/hook) conditions of a telephone.

BRIEF SUMMARY OF THE INVENTION

In accordance with the present invention, a telephone status monitor circuit is provided for determining the on/hook and off/hook conditions of a telephone connected across tip and ring terminals of a telephone system. The tip and ring terminals have a voltage thereacross of a value corresponding to the on/hook or off/hook condition of the telephone.

The status monitor circuit of the invention includes a control means adapted to receive a series of spaced pulses. The control means operates in response to the series of spaced pulses to be actuated between first and second operating states in accordance with said pulses. A charging circuit means is arranged when the control means is in its first operating state to be placed by the control means in circuit with the tip and ring terminals and when the control means is in its second operating state to be removed by the control means out of circuit with the tip and ring terminals. The charging circuit means is operative when coupled in circuit with the tip and ring terminals by the control means to be charged to the value of the voltage then present across the tip and ring terminals.

A status circuit means is arranged when the control means is in its second operating state to be connected by the control means in circuit with the charging circuit means. The status circuit means is operative when connected with the charging circuit means to examine the value of the voltge to which the charging circuit means has been charged and when the value of the charged voltage corresponds to an on/hook condition of the telephone to produce a first output signal, and when the value of the charged voltage corresponds to an off-/hook condition of the telephone to produce a second output signal.

BRIEF DESCRIPTION OF THE DRAWING

Various objects, features and advantages of a telephone status monitor circuit in accordance with the invention will be apparent from the following description taken in conjunction with the accompanying drawing in which the single FIGURE is a schematic diagram of a telephone status monitor circuit in accordance with the invention.

DETAILED DESCRIPTION OF THE INVENTION

Referring now to the single FIGURE, there is shown a schematic diagram of a telephone status monitor circuit 10 in accordance with the present invention. The telephone status monitor circuit 10 is adapted in accordance with the invention to detect the status of a telephone S connected across a pair of subscriber terminals T1, R1. The subscriber terminals T1, R1 are in turn coupled to a corresponding pair of terminals T,R. The terminals T and R represent standard tip and ring terminals and are connected via a telephone line to a telephone central office (not shown) as is common practice in telephone systems. A voltage normally appears across the tip and ring terminals T, R having a value dependent on whether the telephone S is in an off/hook condition or an on/hook condition. Specifically, when the telephone S is in an on/hook condition, the voltage across the tip and ring terminals T, R has a typical value of from 40–56 volts d.c. When the telephone S is in an off/hook condition, the voltage across the tip and ring terminals T, R has a typical value of less than 20 volts d.c.

The telephone status monitor circuit 10, to be described in detail hereinafter, operates to examine the voltages across the tip and ring terminals T, R and, depending on whether the voltage across the terminals T, R at the time of examination has a value corresponding to an on/hook condition or to an off/hook condition, to produce a corresponding first or second output signal at an output terminal 12 thereof. More particularly, if the voltage across the tip and ring terminals T, R at the time of examination has a value corresponding to an on/hook condition (between 40 and 56 volts d.c.), a first output signal, specifically, a binary "1" output signal, is produced at the output terminal 12 representative of the on/hook condition. If the voltage across the tip and ring terminals T, R at the time of examination has a value corresponding to an off/hook condition (less than 20 volts d.c.), a second output signal, specifically, a binary "0" output signal, is produced at the output terminal 12 representative of the off/hook condition. The output signals produced at the output terminal 12 may be applied to any suitable output apparatus for utilization thereby in any desired manner. By way of example, the output signals may be stored in a register with the binary "1" output signals representative of on/hook conditions being employed as needed in those cases in which it is desired to utilize the telephone line for operations other than normal call processing operations, for example, for data transmission applications. In addition, it may be desired to detect transitions between binary "1" and "0" signals as an indication of utilization of the telephone S.

The examination by the status monitor circuit 10 of the voltages across the tip and the ring terminals T, R occurs on a frequent, and preferably periodic, basis, for example, once per minute. This frequent examination is considered desirable in those cases in which it is desired to perform some action only when the telephone S is on an on/hook condition, that is, the subscriber is not using the telephone S for making and receiving regular calls. Before such action can take place, the conclusion or termination of any call being made or received by a subscriber must first be detected. The frequent examination or sampling of the voltages across the tip and ring terminals T, R takes place until the termination of the call has been detected. At this time, a binary "1" output signal representative of the on/hook condition of the telephone S is produced at the output terminal 12 of the status monitor circuit 10 and may be used for initiating any further desired action as mentioned above.

The operation of the status monitor circuit 10 will now be described in greater detail. As mentioned above, the status monitor circuit 10 examines or samples the voltages across the tip and ring terminals T, R on a frequent basis, for example, the aforementioned rate of once per minute. The sampling operation is under the control of a series of spaced pulses (e.g., of 10 microsecond widths) applied to a control terminal 13 of the status monitor circuit 10. These pulses, which may be derived from any suitable source, have a typical form as shown in the FIGURE and are applied to a relay K1. The relay K1 is caused to be energized by these pulses as a result of which switches S1 and S2 associated with the relay K1 are caused alternately to switch between first (de-energized) and second (energized) positions. The first and second positions of the switches S1 and S2 are indicated in FIG. 1 by the designations "o" and "c", respectively.

When the switches S1 and S2 are in their first (de-energized) positions as shown in the FIGURE, the voltage then present across the tip and ring terminals T, R is applied via the switches S1 and S2 across a series combination of a current-limiting resistance R1 and a sampling capacitance C1. This voltage serves to charge the capacitance C1 to the existing line voltage value, specifically, to either a value of 40–56 volts for an on/-hook condition or to a value of less than 20 volts for an off/hook condition. At such time as the relay K1 is energized, specifically, during the positive pulses of the pulse trains as shown in the FIGURE, the switches S1 and S2 are actuated to their second positions as a result of which the resistance R1 and the capacitance C1 are uncoupled from across the tip and ring terminals T, R. The uncoupling action does not interfere in any manner with the subscriber's use of the telephone.

The voltage established across the capacitance C1 as discussed above is applied to and examined by circuitry including four diodes D1–D4, a pair of resistances R2 and R3 connected in series between the junctures of the diodes D1, D3 and D2, D4 and ground potential, and a comparator 15 coupled between the juncture of the resistances R2 and R3 and the output terminal 12. The diodes D1 and D4 are provided and required for the specific situation in which the voltage at the tip terminal T is positive relative to the ring terminal R and, similarly, the diodes D2 and D3 are provided and required for the alternative situation in which the voltage at the tip terminal T is negative relative to the ring terminal R. The resistances R2 and R3 are employed as a voltage-divider circuit.

Assuming that the voltage at the tip terminal T is positive relative to the ring terminal R, the voltage across the capacitance C1 at the time of the above-described uncoupling action establishes a current path which extends from the capacitance C1, through the switch S2 in its second position, the diode D4, the resistances R3 and R2, the diode D1, the switch S1 in its second position, and the resistance R1 back to the capacitance C1. If the voltage at the tip terminal T is negative relative to the ring terminal R, the voltage across the capacitance C1 at the time of the uncoupling action establishes a current path which extends from the capacitance C1, through the resistance R1, the switch S1 in its second position, the diode D2, the resistances R3 and R2, the diode D3, and the switch S2 in its second position, back to the capacitance C1.

As current flows through the resistances R2 and R3 is either of the two above described situations, a voltage is developed across the resistance R3 which, in a common voltage divider fashion, is equal to R3/R2+R3 times the voltage across both of the resistances R2 and R3. The voltage across R3 is always positive with respect to ground and is compared in the comparator 15 with a reference voltage $V_{REF}$. If the value of the voltage across the resistance R3 is greater than the value of the reference voltage $V_{REF}$, a binary "1" output signal is produced at the output terminal 12 of the comparator 15 indicating an on/hook condition of the telephone S. If the value of the voltage across the resistance R3 is less than the value of the reference voltage $V_{REF}$, a binary "0" output signal is produced at the output terminal 12 of the comparator 15 indicating an off/hook condition of the telephone S.

As mentioned previously, the output signals produced at the output terminal 12 may be applied to and used by suitable output apparatus in any desired manner.

Some suitable values of components for the status monitor circuit 10 corresponding to the signal discussed hereinabove are as follows:

| | |
|---|---|
| C1 | 0.10 microfarads |
| R1 | 1.8 Kilohms |
| R2 | 100 Kilohms |
| R3 | 10 Kilohms |
| D1-D4 | RD1343 |
| $V_{REF}$ | 2.5 volts |

While there has been described what is considered to be a preferred embodiment of the invention it will be apparent to those skilled in the art that various changes and modifications may be made therein without departing from the invention as called for in the appended claims.

What is claimed is:

1. A telephone status monitor circuit for determining the on/hook and off/hook conditions of a telephone connected across tip and ring terminals of a telephone system, said tip and ring terminals having a voltage thereacross of a value corresponding to the on/hook condition or off/hook condition of the telephone, said status monitor circuit comprising:

control means adapted to receive a series of spaced pulses and operative in response to said pulses to be actuated between first and second operating states in accordance with said pulses;

charging circuit means arranged when the control means is in its first operating state to be placed by the control means in circuit with the tip and ring terminals and when the control means is in its second operating state to be removed by the control means out of circuit with the tip and ring terminals; said charging circuit means being operative when coupled in circuit with the tip and ring terminals by the control means to be charged to the value of the voltage then present across the tip and ring terminals; and status circuit means arranged when the control means is in its second operating state to be connected by the control means in circuit with the charging circuit means, said status circuit means being operative when connected with the charging circuit means to examine the value of voltage to which the charging circuit means has been charged and when the value of the charged voltage corresponds to an on/hook condition of the telephone to produce a first output signal, and when the value of the charged voltage corresponds to an off/hook condition of the telephone to produce a second output signal.

2. A telephone status monitor circuit in accordance with claim 1 wherein:

the charging circuit means includes a capacitance element.

3. A telephone status monitor circuit in accordance with claim 1 wherein:

the control means comprises:

relay means adapted to receive the series of pulses and operative in response to said pulses to be controlled between first and second energization states; and first and second monitor switch means associated with the relay means and operative in response to the relay means being controlled between its first and second energization states to switch between corresponding first and second positions;

said charging circuit means being arranged when the first and second monitor switch means are in their first positions to be placed, together with the first and second monitor switch means, in a series path with the tip and ring terminals and across the tip and ring terminals, and further arranged when the first and second monitor switch means are in their second positions to be removed from the series path to the tip and ring terminals and from across the tip and ring terminals.

4. A telephone status monitor circuit in accordance with claim 3 wherein the status circuit means comprises:

circuit means arranged when the first and second monitor switch means are in their second positions to be coupled across the charging circuit means and to derive a voltage from the voltage to which the charging circuit means has been charged; and comparator means operative to compare the value of the derived voltage with a reference voltage and to produce a first output signal representative of an on/hook condition when the value of the derived voltage bears a predetermined first relationship to the value of the reference voltage and to produce a second output signal representative of an off/hook condition when the value of the derived voltage bears a predetermined second relationship to the value of the reference voltage.

5. A telephone status monitor circuit in accordance with claim 4 wherein:

the charging circuit means includes a capacitance element.

6. A telephone status monitor circuit in accordance with claim 4 wherein:

the charging circuit means includes a series combination of a capacitance element and a resistance element.

7. A telephone status monitor circuit in accordance with claim 6 wherein said circuit means includes:

first and second diodes;

voltage-divider circuit means connected in a series path with and intermediate to the first and second diodes;

said first and second diodes and said voltage divider means being arranged when the first and second switch means are in their second positions to be placed in a series path with the charging circuit means and the first and second switch means; and said voltage-divider circuit means being operative in response to the voltage to which the charging circuit means has been charged to derive a voltage therefrom having a value related to the value of the charged voltage.

8. A telephone status monitor circuit in accordance with claim 7 wherein:

the relay means includes a terminal for receiving pulses at a rate of about one per minute.

* * * * *